United States Patent [19]

Sundstrom

[11] 4,159,569

[45] Jul. 3, 1979

[54] CHAIN SAW GUIDE BAR

[75] Inventor: Erik W. Sundstrom, Sandviken, Sweden

[73] Assignee: Sandvik Aktiebolag, Sandviken, Sweden

[21] Appl. No.: 881,605

[22] Filed: Feb. 27, 1978

Related U.S. Application Data

[63] Continuation of Ser. No. 725,122, Sep. 20, 1976, abandoned.

[51] Int. Cl.[2] .............................................. B23D 57/02

[52] U.S. Cl. .......................................... 30/384; 83/824

[58] Field of Search ..................... 83/824, 285; 30/384, 30/385

[56] References Cited

U.S. PATENT DOCUMENTS 3,334,670 8/1967 Merz ..................................... 30/384

FOREIGN PATENT DOCUMENTS 165565 2/1934 Switzerland ............................... 30/385

*Primary Examiner*—Harold D. Whitehead

*Attorney, Agent, or Firm*—Burns, Doane, Swecker & Mathis

[57] ABSTRACT

A sprocket wheel, bearing and bearing plate of a chain saw guide bar are mounted as a separate unit between the side plates of the guide bar.

3 Claims, 3 Drawing Figures

CHAIN SAW GUIDE BAR

This is a continuation, of application Ser. No. 725,122, filed Sept. 20, 1976 now abandoned.

This invention relates to a chain saw guide bar with a sprocket wheel which is surrounded by the side plates of the guide bar and journalled on a bearing plate by a roller bearing.

It has been found difficult to mount the rollers of the bearing between the side plates of the guide bar when producing and repairing the guide bar. In order to facilitate the mounting of the sprocket wheel and bearing between the side plates it is therefore proposed according to the present invention that the bearing center which supports the sprocket wheel is provided with flanges which are fastened to the bearing center and surround the inner part of the sprocket wheel whereby sprocket wheel, bearing and bearing plate can be mounted between the side plates of the guide bar as a separate unit. Due to this fact the sprocket wheel is retained on the bearing, and the rollers are retained in the roller bearing. The unit formed by sprocket wheel and bearing is, therefore, very easy to mount and to exchange.

Other objects and advantages of the invention will become apparent from a study of the following specification when considered in conjunction with the accompanying drawing, in which.

Figure 1:
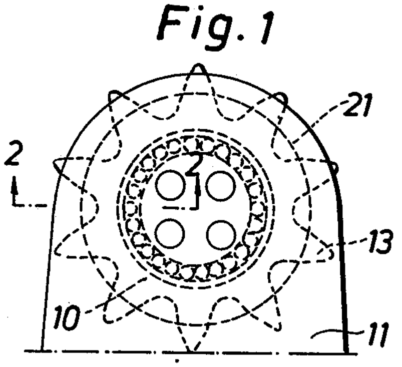
FIG. 1 is a side view of the free end of the guide bar.

Referring now to FIG. 1 there is shown a sprocket wheel 10 which is placed between the side plates 11 of a guide bar. The sprocket wheel is provided with teeth 13, arranged to support the saw chain in the manner shown in U.S. Pat. No. 3,124,177.

Figure 2:
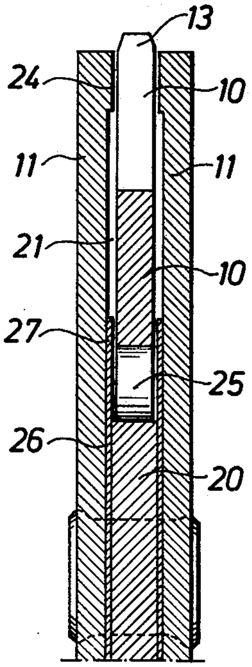
FIG. 2 is a sectional view of one embodiment of the invention taken along line 2—2 of FIG. 1.

In FIG. 2 there is shown a sectional view of an embodiment of the invention taken along line 2—2 of FIG. 1, by which the inner surfaces of the side plates 11 are provided with an annular recess 21 between a peripheral elevated portion 24 and a central elevated portion 26. Thus, and as will be apparent from viewing FIG. 2, the spacing between the root portions of the teeth and the side plate inner surfaces is greater than the spacing between peripheral portions of the teeth and the side plate inner surfaces. As a result, friction-contact at the root portions of the teeth is prevented. This is of importance, because these portions are susceptible to breaking as a result of friction hardening.

The central elevated portion is composed of a separate flange plate 26, which is fastened to the bearing center 20. The two flange plates 26 project from the bearing center and form flanges 27 which surround the inner part of the sprocket wheel. Due to this fact, the bearing center 20 is kept together with the sprocket wheel 10. Moreover, the rollers 25 of the roller bearing are retained at their places. The unit that is formed by the parts 10, 20, 25 and 26 can be separately manufactured and then mounted between the side plates 11 of the guide bar. The flange plates 26 can be fastened to bearing center 20 by spot welding, riveting or folding.

Figure 3:
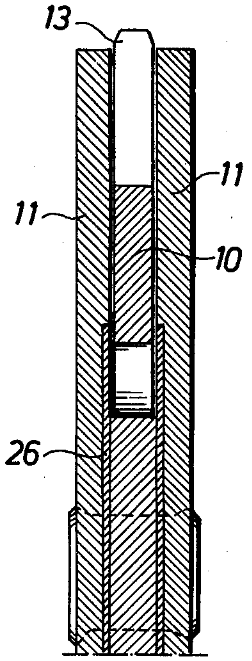
FIG. 3 is a sectional view of a second embodiment taken along line 2—2 of FIG. 1.

In FIG. 3 there is shown another embodiment of the same section as in FIG. 2. Here there are no recesses 21 in the side plates 11 of the guide bar. The flange plates 26 of the bearing, forming a unit with bearing center 20, rollers 25 and sprocket wheel 10, are in this case countersunk in the side plates 11 of the guide bar.

While the best form and embodiment of the invention has been illustrated and described, it will be apparent to those skilled in the art that modifications and changes may be made in the apparatus described without deviating from the invention set forth in the following claims.

I claim:

1. In a chain saw of the type comprising a guide bar around which a saw chain is to travel, said guide bar including a pair of spaced side plates defining a nose portion at one end of said guide bar, and rotary support means mounted in said nose portion between said side plates for supporting the saw chain during travel around said nose portion, said rotary support means comprising:

a bearing center fastened to and between said side plates, cylindrical roller bearing means disposed around an outer periphery of said bearing center, a sprocket wheel journaled on said bearing means, and a pair of flange plates attached to said bearing center and extending radially outwardly a distance sufficient to surround said bearing center, said bearing means, and an inner portion of said sprocket wheel so that said sprocket wheel, cylindrical roller bearing means, bearing center, and flange plates form a unit for removal from and insertion into said nose portion, the spacing between said flange plates being greater than the thickness of said sprocket wheel disposed therebetween to avoid interference with rotation of the sprocket wheel.

2. Apparatus according to claim 1, wherein said flange plates are attached to said bearing center by a welded connection.

3. Apparatus according to claim 1, wherein said flange plates are attached to said bearing center by a rivet connection.

* * * * *